US007868240B2

(12) United States Patent
Kobayashi

(10) Patent No.: US 7,868,240 B2
(45) Date of Patent: Jan. 11, 2011

(54) SIGNAL PROCESSING APPARATUS AND SIGNAL PROCESSING METHOD, PROGRAM, AND RECORDING MEDIUM

(75) Inventor: Yoshiyuki Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/350,519

(22) Filed: Jan. 8, 2009

(65) Prior Publication Data

US 2009/0114081 A1 May 7, 2009

Related U.S. Application Data

(63) Continuation of application No. 11/082,778, filed on Mar. 18, 2005, now Pat. No. 7,507,901.

(30) Foreign Application Priority Data

Mar. 23, 2004 (JP) ............................ 2004-084815

(51) Int. Cl.
*G01H 7/00* (2006.01)
*G01H 5/00* (2006.01)

(52) U.S. Cl. ............................ 84/612; 84/605; 84/607; 84/609; 84/615; 84/622; 84/652; 84/662

(58) Field of Classification Search .................. 84/612, 84/605, 607, 609, 622, 652, 662, 615
See application file for complete search history.

(56) References Cited

U.S. PATENT DOCUMENTS

| | | | | |
|---|---|---|---|---|
| 4,887,505 | A * | 12/1989 | Suzuki | 84/714 |
| 5,350,882 | A * | 9/1994 | Koguchi et al. | 84/636 |
| 5,952,596 | A * | 9/1999 | Kondo | 84/605 |
| 6,188,967 | B1 * | 2/2001 | Kurtzberg et al. | 702/84 |
| 6,392,135 | B1 * | 5/2002 | Kitayama | 84/622 |
| 6,721,711 | B1 * | 4/2004 | Hoshiai | 704/500 |
| 7,236,226 | B2 * | 6/2007 | Hung et al. | 352/12 |
| 7,507,901 | B2 * | 3/2009 | Kobayashi | 84/612 |
| 2002/0053275 | A1 * | 5/2002 | Ogawa et al. | 84/662 |
| 2003/0133700 | A1 * | 7/2003 | Uehara | 386/96 |
| 2004/0069123 | A1 * | 4/2004 | Becker et al. | 84/612 |
| 2004/0177746 | A1 * | 9/2004 | Becker | 84/612 |
| 2005/0217462 | A1 * | 10/2005 | Thomson et al. | 84/612 |
| 2005/0275805 | A1 * | 12/2005 | Lin et al. | 352/12 |
| 2005/0283360 | A1 * | 12/2005 | Large | 704/205 |
| 2006/0047623 | A1 * | 3/2006 | Kimura et al. | 707/1 |
| 2006/0185501 | A1 * | 8/2006 | Shiraishi et al. | 84/612 |
| 2007/0044641 | A1 * | 3/2007 | McKinney et al. | 84/612 |

(Continued)

FOREIGN PATENT DOCUMENTS

| | | |
|---|---|---|
| JP | 04-336599 | 11/1992 |

(Continued)

*Primary Examiner*—Elvin G Enad
*Assistant Examiner*—Christina Russell
(74) *Attorney, Agent, or Firm*—Oblon, Spivak, McClelland, Maier & Neustadt, L.L.P.

(57) ABSTRACT

A signal processing apparatus is disclosed which processes an audio signal. The signal processing apparatus includes a detection section which detects a first tempo from an audio signal, a calculation section which calculates a speed feeling that indicates whether the first tempo is fast or slow, and a determining section which determines a second tempo by correcting the first tempo using the speed feeling.

4 Claims, 14 Drawing Sheets

U.S. PATENT DOCUMENTS

| | | | | |
|---|---|---|---|---|
| 2007/0157797 | A1 * | 7/2007 | Hashizume et al. | 84/609 |
| 2007/0180980 | A1 * | 8/2007 | Kim | 84/612 |
| 2009/0260506 | A1 * | 10/2009 | Saperston | 84/612 |

FOREIGN PATENT DOCUMENTS

| | | |
|---|---|---|
| JP | 07-064544 | 3/1995 |
| JP | 07-191697 | 7/1995 |
| JP | 07-295560 | 11/1995 |
| JP | 08-196637 | 8/1996 |
| JP | 10-134549 | 5/1998 |
| JP | 2000-347659 | 12/2000 |
| JP | 2001-042877 | 2/2001 |
| JP | 2002-116754 | 4/2002 |
| JP | 2002-287744 | 10/2002 |
| JP | 2003-022096 | 1/2003 |
| JP | 2003-263162 | 9/2003 |

* cited by examiner

SIGNAL PROCESSING APPARATUS AND SIGNAL PROCESSING METHOD, PROGRAM, AND RECORDING MEDIUM

CROSS-REFERENCE TO RELATED APPLICATIONS

This application is a continuation of U.S. patent application Ser. No. 11/082,778, filed Mar. 18, 2005, the entire contents of which is hereby incorporated herein by reference. U.S. patent application Ser. No. 11/082,778 also claims priority to JP 2004-084815 filed Mar. 23, 2004.

BACKGROUND OF THE INVENTION

This invention relates to a signal processing apparatus and a signal processing method, a program, and a recording medium, and more particularly to a signal processing apparatus and a signal processing method, a program, and a recording medium by which a feature value of an audio signal such as the tempo is detected with a high degree of accuracy.

Various methods are known by which the tempo of an audio signal of, for example, a tune is detected. According to one of the methods, a peak portion and a level of an autocorrelation function of sound production starting time of an audio signal are observed to analyze the periodicity of the sound production time, and the tempo which is the number of quarter notes for one minute is detected from a result of the analysis. The method described is disclosed, for example, in Japanese Patent Laid-Open No. 2002-116754.

However, according to such a method of detecting the tempo from the periodicity of sound production time of a peak portion of an autocorrelation function as described above, if a peak appears at a portion corresponding to an eighth note in an autocorrelation function, then not the number of quarter notes for one minute but the number of eighth notes is likely to be detected as the tempo. For example, also music of the tempo 60 (the number of quarter notes for one minute is 60) is sometimes detected as music of the tempo 120 wherein the number of peaks for one minute, that is, the number of eighth notes, is 120. Accordingly, it is difficult to accurately detect the tempo.

Also a large number of algorithms are available for detecting the tempo instantaneously from an audio signal for a certain short period of time. However, it is difficult to detect the tempo of an overall tune using the algorithms.

SUMMARY OF THE INVENTION

It is an object of the present invention to provide a signal processing apparatus and a signal processing method, a program, and a recording medium by which a feature value of an audio signal such as the tempo can be detected with a high degree of accuracy.

In order to attain the object described above, according to an aspect of the present invention, there is provided a signal processing apparatus for processing an audio signal, comprising a production section for producing a level signal representative of a transition of the level of the audio signal, a frequency analysis section for frequency analyzing the level signal produced by the production section, and a feature value calculation section for determining a feature value or values of the audio signal based on a result of the frequency analysis by the frequency analysis section.

According to another aspect of the present invention, there is provided a signal processing method for a signal processing apparatus which processes an audio signal, comprising a production step of producing a level signal representative of a transition of the level of the audio signal, a frequency analysis step of frequency analyzing the level signal produced by the process at the production step, and a feature value calculation step of determining a feature value or values of the audio signal based on a result of the frequency analysis by the process at the frequency analysis step.

According to a further aspect of the present invention, there is provided a program for causing a computer to execute processing of an audio signal, comprising a production step of producing a level signal representative of a transition of the level of the audio signal, a frequency analysis step of frequency analyzing the level signal produced by the process at the production step, and a feature value calculation step of determining a feature value or values of the audio signal based on a result of the frequency analysis by the process at the frequency analysis step.

According to a still further aspect of the present invention, there is provided a recording medium on or in which a program for causing a computer to execute processing of an audio signal is recorded, the program comprising a production step of producing a level signal representative of a transition of the level of the audio signal, a frequency analysis step of frequency analyzing the level signal produced by the process at the production step, and a feature value calculation step of determining a feature value or values of the audio signal based on a result of the frequency analysis by the process at the frequency analysis step.

In the signal processing apparatus, signal processing method, program and recording medium, a level signal representative of a transition of the level of an audio signal is produced and frequency analyzed. Then, a feature value of the audio signal is determined based on a result of the frequency analysis.

Therefore, with the signal processing apparatus, signal processing method, program and recording medium, a feature value of music such as the temp can be detected with a high degree of accuracy.

The above and other objects, features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENT

Figure 1:
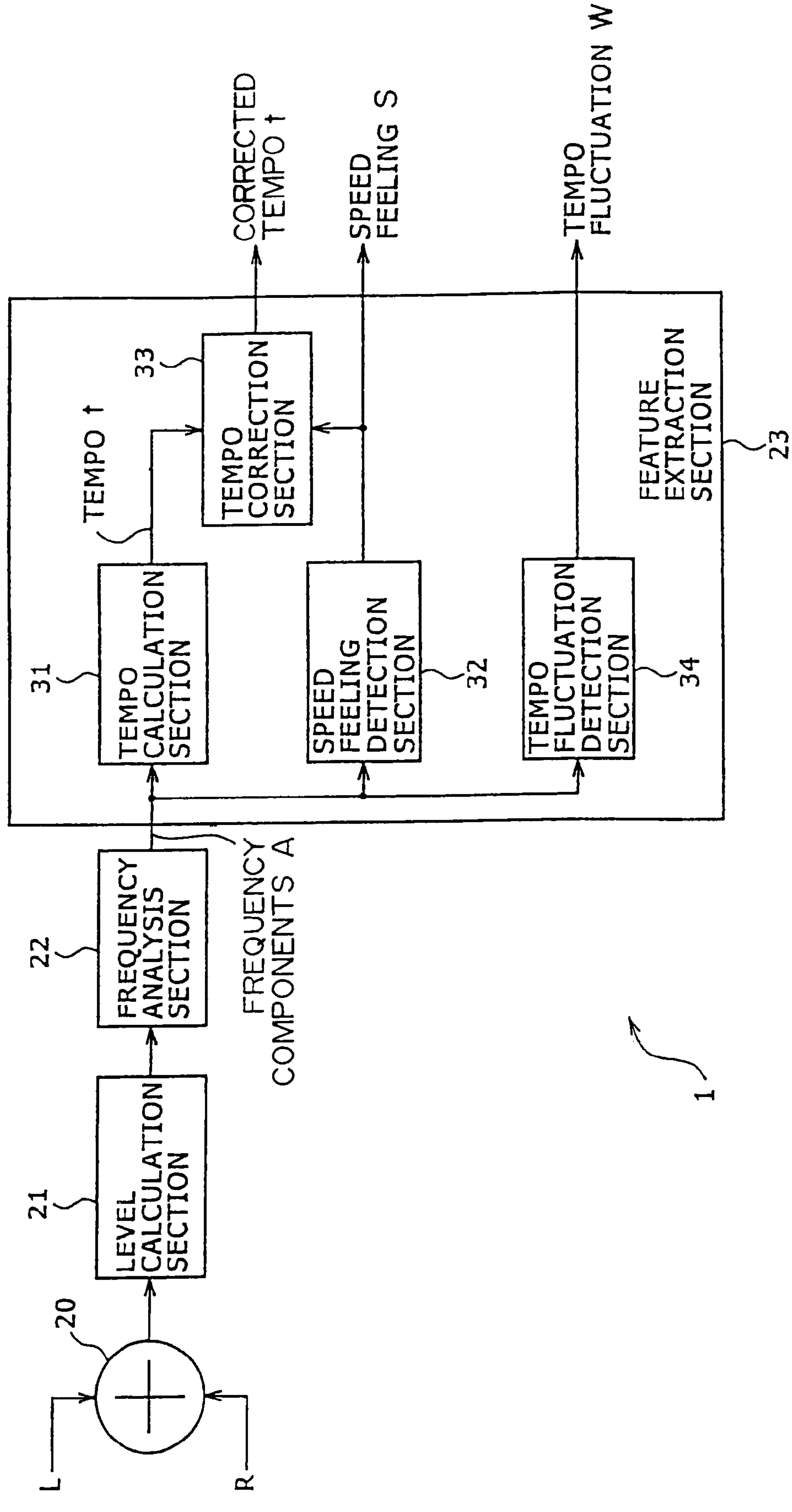
FIG. 1 is a block diagram showing an example of a configuration of a feature value detection apparatus to which the present invention is applied.

Before the best mode for carrying out the present invention is described in detail, a corresponding relationship between several features recited in the accompanying claims and particular elements of the preferred embodiment described below is described. It is to be noted, however, that, even if some mode for carrying out the invention which is recited in the specification is not described in the description of the corresponding relationship below, this does not signify that the mode for carrying out the invention is out of the scope or spirit of the present invention. On the contrary, even if some mode for carrying out the invention is described as being within the scope or spirit of the present invention in the description of the corresponding relationship below, this does not signify that the mode is not within the spirit or scope of some other invention than the present invention.

Further, the following description does not signify all of the invention disclosed in the present specification. In other words, the following description does not deny the presence of an invention which is disclosed in the specification but is not recited in the claims of the present application, that is, the description does not deny the presence of an invention which may be filed for patent in a divisional patent application or may be additionally included into the present patent application as a result of later amendment.

According to the present invention, there is provided a signal processing apparatus (for example, a feature value detection apparatus 1 of FIG. 1) for processing an audio signal, comprising a production section (for example, a level calculation section 21 of FIG. 1) for producing a level signal representative of a transition of the level of the audio signal, a frequency analysis section (for example, a frequency analysis section 22 of FIG. 1) for frequency analyzing the level signal produced by the production section, and a feature value calculation section (for example, a feature extraction section 23 of FIG. 1) for determining a feature value or values of the audio signal based on a result of the frequency analysis by the frequency analysis section.

According to the present invention, the signal processing apparatus may further comprise a statistic processing section (for example, a statistic processing section 49 of FIG. 2) for performing a statistic process of the result of the frequency analysis by the frequency analysis section. In this instance, the feature value calculation section determines the feature value or values based on the result of the frequency analysis statistically processed by the statistic processing section.

According to the present invention, the signal processing apparatus may further comprise a frequency component processing section (for example, a frequency component processing section 48 of FIG. 2) for adding, to frequency components of the level signal of the result of the frequency analysis by the frequency analysis section, frequency components having a relationship of harmonics to the frequency components and outputting the sum values as the frequency components of the level signal. In this instance, the feature value calculation section determines the feature value or values based on the frequency components outputted from the frequency component processing section.

According to the present invention, there is provided a signal processing method for a signal processing apparatus which processes an audio signal, comprising a production step (for example, a step S12 of FIG. 5) of producing a level signal representative of a transition of the level of the audio signal, a frequency analysis step (for example, a step S13 of FIG. 5) of frequency analyzing the level signal produced by the process at the production step, and a feature value calculation step (for example, steps S14 to S16 of FIG. 5) of determining a feature value or values of the audio signal based on a result of the frequency analysis by the process at the frequency analysis step.

According to the present invention, there are provided a program for causing a computer to execute processing of an audio signal and a recording medium on or in which a program for causing a computer to execute processing of an audio signal is recorded, the program comprising a production step (for example, a step S12 of FIG. 5) of producing a level signal representative of a transition of the level of the audio signal, a frequency analysis step (for example, a step S13 of FIG. 5) of frequency analyzing the level signal produced by the process at the production step, and a feature value calculation step (for example, steps S14 to S16 of FIG. 5) of determining a feature value or values of the audio signal based on a result of the frequency analysis by the process at the frequency analysis step.

In the following, a preferred embodiment of the present invention is described.

Referring to FIG. 1, there is shown in block diagram an example of a configuration of a feature value detection apparatus to which the present invention is applied.

The feature value detection apparatus 1 shown receives an audio signal supplied thereto as a digital signal of a tune reproduced, for example, from a CD (Compact Disc) and detects and outputs, for example, a tempo t, a speed feeling S and a tempo fluctuation W as feature values of the audio signal. It is to be noted that, in FIG. 1, the audio signal supplied to the feature value detection apparatus 1 is a stereo signal.

The feature value detection apparatus 1 includes an adder 20, a level calculation section 21, a frequency analysis section 22 and a feature extraction section 23.

An audio signal of the left channel and another audio channel of the right channel of a tune are supplied to the adder 20. The adder 20 adds the audio signals of the left and right channels and supplies a resulting signal to the level calculation section 21.

The level calculation section 21 produces a level signal representative of a transition of the level of the audio signal supplied thereto from the adder 20 and supplies the produced level signal to the frequency analysis section 22.

The frequency analysis section 22 frequency analyzes the level signal representative of a transition of the level of the audio signal supplied thereto from the level calculation section 21 and outputs frequency components A of individual frequencies of the level signal as a result of the analysis. Then, the frequency analysis section 22 supplies the frequency components A to the feature extraction section 23.

The feature extraction section 23 includes a tempo calculation section 31, a speed feeling detection section 32, a tempo correction section 33 and a tempo fluctuation detection section 34.

The tempo calculation section 31 outputs a tempo (feature value) t of the audio signal based on the frequency components A of the level signal supplied thereto from the frequency analysis section 22 and supplies the tempo t to the tempo correction section 33.

The speed feeling detection section 32 detects a speed feeling S of the audio signal based on the frequency components A of the level signal supplied thereto from the frequency analysis section 22 and supplies the speed feeling S to the tempo correction section 33. Further, the speed feeling detection section 32 outputs the speed feeling S as one of feature values of the audio signal to the outside.

The tempo correction section 33 corrects the tempo t supplied thereto from the tempo calculation section 31 as occasion demands based on the speed feeling S supplied thereto from the speed feeling detection section 32. Then, the tempo correction section 33 outputs the corrected tempo t as one of feature values of the audio signal to the outside.

The tempo fluctuation detection section 34 detects a tempo fluctuation W which is a fluctuation of the tempo of the audio signal based on the frequency components A of the level signal supplied thereto from the frequency analysis section 22 and outputs the tempo fluctuation W as one of the feature values of the audio signal to the outside.

In the feature value detection apparatus 1 having such a configuration as described above, audio signals of the left channel and the right channel of a tune are supplied to the level calculation section 21 through the adder 20. The level calculation section 21 converts the audio signals into a level signal. Then, the frequency analysis section 22 detects frequency components A of the level signal, and the tempo calculation section 31 arithmetically operates the tempo t based on the frequency components A while the speed feeling detection section 32 detects the speed feeling S based on the frequency components A. The tempo correction section 33 corrects the tempo t based on the speed feeling S as occasion demands and outputs the corrected tempo t. Meanwhile, the tempo fluctuation detection section 34 detects and outputs the tempo fluctuation W based on the frequency components A.

Figure 2:
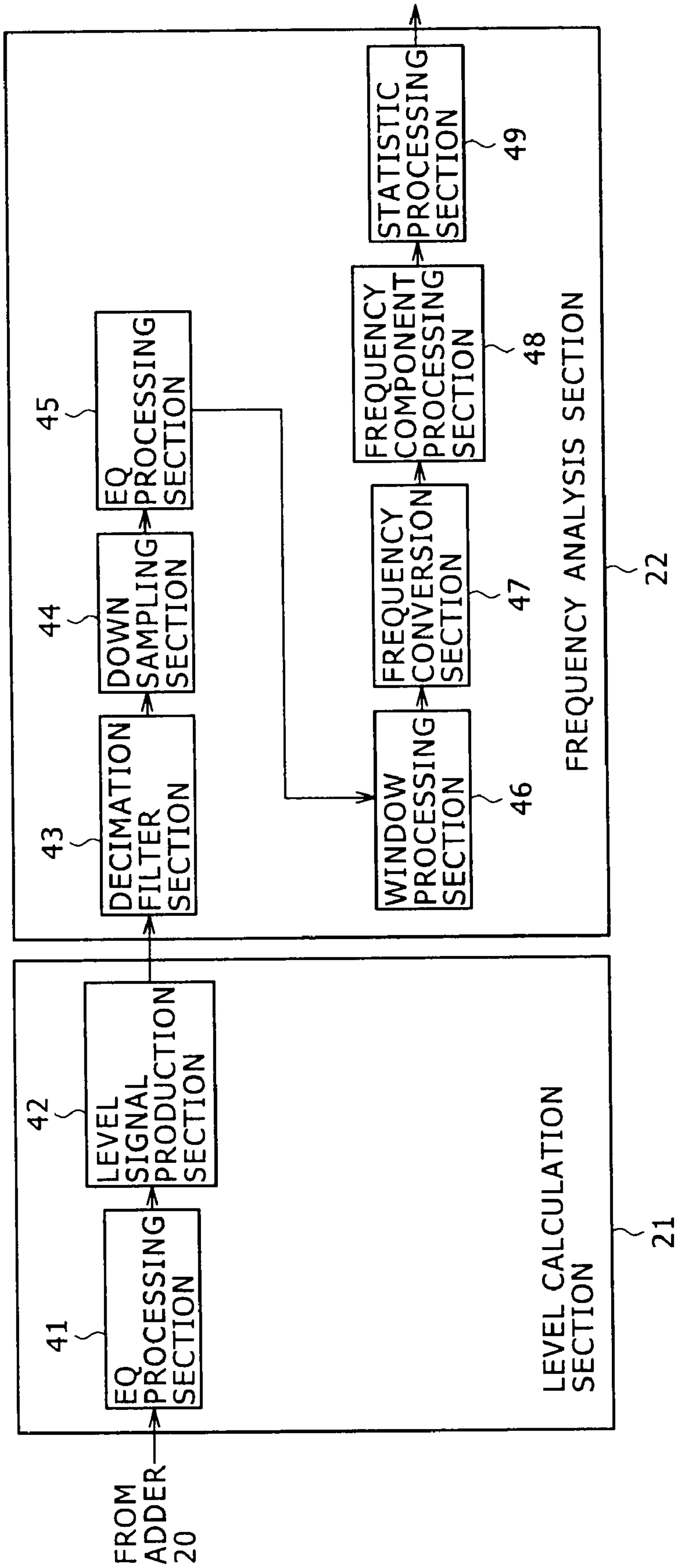
FIG. 2 is a block diagram showing a detailed configuration of a level calculation section and a frequency analysis section shown in FIG. 1.

FIG. 2 shows an example of a detailed configuration of the level calculation section 21 and the frequency analysis section 22 shown in FIG. 1.

Referring to FIG. 2, the level calculation section 21 includes an EQ (Equalize) processing section 41 and a level signal production section 42. The frequency analysis section 22 includes a decimation filter section 43, a down sampling section 44, an EQ processing section 45, a window processing section 46, a frequency conversion section 47, a frequency component processing section 48 and a statistic processing section 49.

An audio signal is supplied from the adder 20 to the EQ processing section 41. The EQ processing section 41 performs a filter process for the audio signal. For example, the EQ processing section 41 has a configuration of a high-pass filter (HPF) and removes low frequency components of the audio signal which are not suitable for extraction of the tempo t. Thus, the EQ processing section 41 outputs an audio signal of frequency components which are suitable for extraction of the tempo t to the level signal production section 42. It is to be noted that the coefficient of the filter used by the filter process of the EQ processing section 41 is not limited specifically.

The level signal production section 42 produces a level signal representative of a transition of the level of the audio signal supplied thereto from the EQ processing section 41 and supplies the level signal to (the decimation filter section 43 of) the frequency analysis section 22. It is to be noted that the level signal may represent, for example, an absolute value or a power (squared) value of the audio signal, a moving average (value) of such an absolute value or power value, a value used for level indication by a level meter or the like. If a value used for level indication by a level meter is adopted as the level signal here, then the absolute value of the audio signal at each sample point makes the level signal at the sample point. However, if the absolute value of the audio signal at a sample point whose level signal is to be outputted now is lower than the level signal at the immediately preceding sample point, then a value obtained by multiplying the level signal at the immediately preceding sample point by a release coefficient R equal to or higher than 0.0 but lower than 1.0 ($0.0 \leqq R < 1.0$) is used as the level signal at the sample point whose level signal is to be outputted now.

The decimation filter section 43 removes high frequency components of the level signal supplied thereto from the level signal production section 42 in order to allow down sampling to be performed by the down sampling section 44 at the next stage. The decimation filter section 43 supplies a resulting level signal to the down sampling section 44.

The down sampling section 44 performs down sampling of the level signal supplied thereto from the decimation filter section 43. Here, in order to detect the tempo t, only those components of the level signal having frequencies of several hundreds Hz or so are required. Therefore, the down sampling section 44 samples out samples of the level signal to decrease the sampling frequency of the level signal to 172 Hz. The level signal after the down sampling is supplied to the EQ processing section 45. Here, the down sampling by the down sampling section 44 can reduce the load (arithmetic operation amount) of later processing.

The EQ processing section 45 performs a filter process of the level signal supplied thereto from the down sampling section 44 to remove low frequency components (for example, a dc component and frequency components lower than a frequency corresponding to the tempo 50 (the number of quarter notes for one minute is 50)) and high frequency components (frequency components higher than a frequency corresponding to the tempo 400 (the number of quarter notes for one minute is 400)) from the level signal. In other words, the EQ processing section 45 removes those low frequency components and high frequency components which are not suitable for extraction of the tempo t. Then, the EQ processing section 45 supplies a level signal of remaining frequencies as a result of the removal of the low frequency components and high frequency components to the window processing section 46.

The window processing section 46 extracts, from the level signal supplied thereto from the EQ processing section 45, the level signals for a predetermined period of time, that is, a predetermined number of samples of the level signal, as one block in a time sequence. Further, in order to reduce the influence of sudden variation of the level signal at the opposite ends of the block or for some other object, the window processing section 46 window processes the level signal of the block using a window function such as a Hamming window or a Hanning window by which portions at the opposite ends of the block are gradually attenuated (or multiplies the level signal of the block by a window function) and supplies a resulting level signal to the frequency conversion section 47.

The frequency conversion section 47 performs, for example, discrete cosine transform for the level signal of the block supplied thereto from the window processing section

46 to perform frequency conversion (frequency analysis) of the level signal. The frequency conversion section 47 obtains frequency components of frequencies corresponding, for example, to the tempos 50 to 1,600 from among the frequency components obtained by the frequency conversion of the level signal of the block and supplies the obtained frequency components to the frequency component processing section 48.

The frequency component processing section 48 processes the frequency components of the level signal of the block from the frequency conversion section 47. In particular, the frequency component processing section 48 adds, to the frequency components of frequencies corresponding to, for example, the tempos 50 to 400 from among the frequency components of the level signal of the block from the frequency conversion section 47, frequency components (harmonics) of frequencies corresponding to tempos equal to twice, three times and four times the tempos, respectively. Then, the frequency component processing section 48 determines results of the addition as frequency components of the frequencies corresponding to the tempos.

For example, to a frequency component of a frequency corresponding to the tempo 50, frequency components of a frequency corresponding to the tempo 100 which is twice the tempo 50, another frequency corresponding to the tempo 150 which is three times the tempo 50 and a further frequency corresponding to the tempo 200 which is four times the tempo 50 are added, and the sum is determined as a frequency component of the frequency corresponding to the tempo 50. Further, for example, to a frequency component of a frequency corresponding to the tempo 100, frequency components of a frequency corresponding to the tempo 200 which is twice the tempo 100, another frequency corresponding to the tempo 300 which is three times the tempo 100 and a further frequency corresponding to the tempo 400 which is four times the tempo 100 are added, and the sum is determined as a frequency component of the frequency corresponding to the tempo 100.

It is to be noted that, for example, the frequency component corresponding to the tempo 100 which is added when the frequency component corresponding to the tempo 50 is to be determined is a frequency component corresponding to the tempo 100 before frequency components of harmonics thereto are added. This also applies to the other tempos.

As described above, the frequency component processing section 48 adds, to individual frequency components of the frequencies corresponding to the range of the tempos 50 to 400, frequency components of harmonics to them and uses the sum values as new frequency components to obtain frequency components of the frequencies corresponding to the range of the tempos 50 to 400 for each block. The frequency component processing section 48 supplies the obtained frequency components to the statistic processing section 49.

Here, a frequency component of a certain frequency represents the degree of possibility that the frequency may be a basic frequency (pitch frequency) $f_b$ of the level signal. Accordingly, the frequency component of the certain frequency can be regarded as basic frequency likelihood of the frequency. It is to be noted that, since the basic frequency $f_b$ represents that the level signal exhibits repetitions with the basic frequency, it corresponds to the tempo of the original audio signal.

The statistic processing section 49 performs a statistic process for blocks of one tune. In particular, the statistic processing section 49 adds frequency components of the level signal for one tune supplied thereto in a unit of a block from the frequency component processing section 48 for each frequency. Then, the statistic processing section 49 supplies a result of the addition of frequency components over the blocks for one tune obtained by the statistic process as frequency components A of the level signal of the one tune to the feature extraction section 23.

Figure 3:
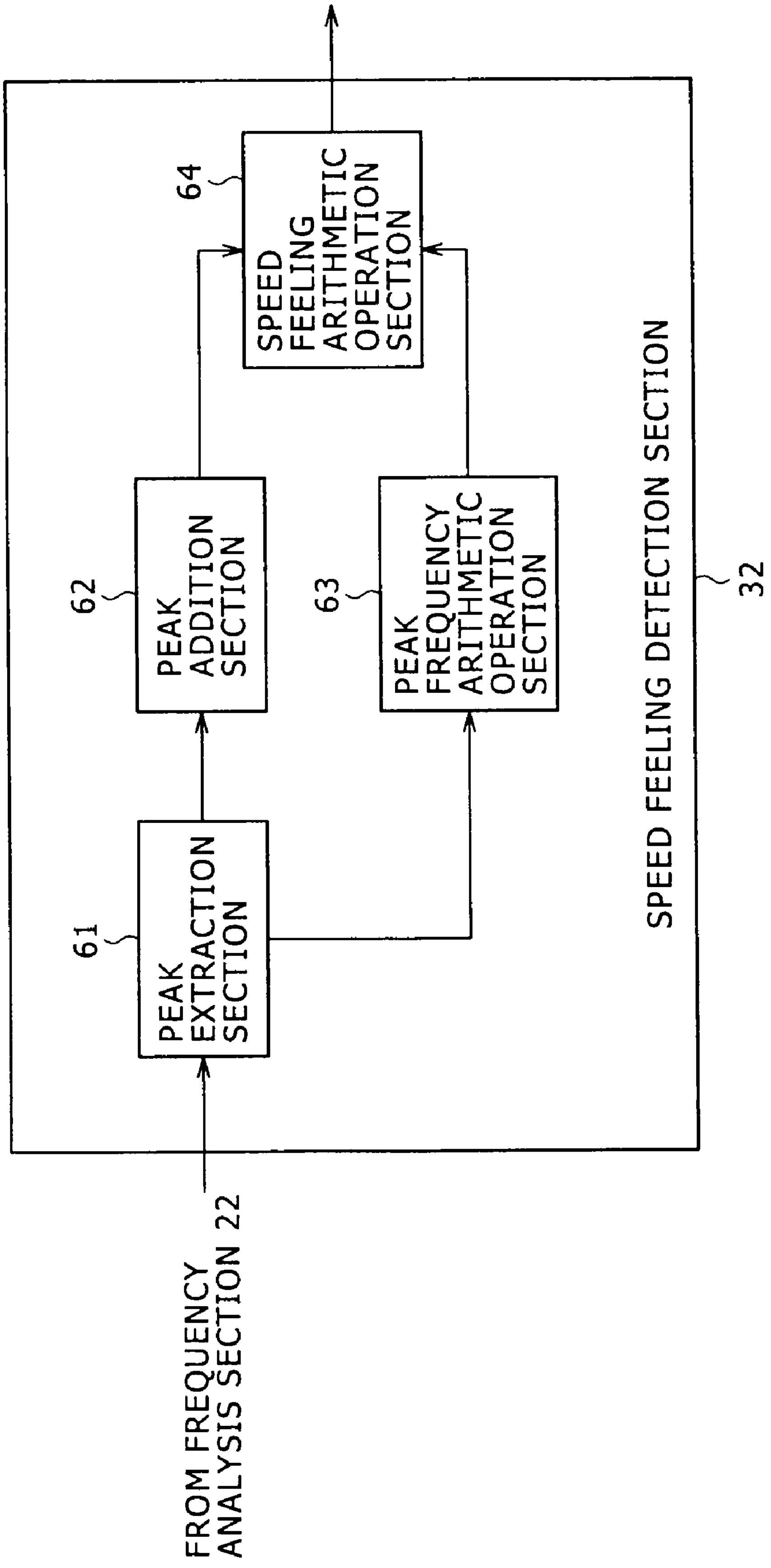
FIG. 3 is a block diagram showing a detailed configuration of a speed feeling detection section shown in FIG. 1.

FIG. 3 shows in block diagram an example of a detailed configuration of the speed feeling detection section 32 shown in FIG. 1.

Referring to FIG. 3, the speed feeling detection section 32 shown includes a peak extraction section 61, a peak addition section 62, a peak frequency arithmetic operation section 63 and a speed feeling arithmetic operation section 64.

Frequency components A of the level signal are supplied from the frequency analysis section 22 to the peak extraction section 61. The peak extraction section 61 extracts, for example, frequency components of peak values (maximum values) from among the frequency components A of the level signal and further extracts frequency components $A_1$ to $A_{10}$ having 10 comparatively high peak values in a descending order from the extracted frequency components. Here, the frequency component having the ith peak in the descending order is represented by $A_i$ (i=1, 2, . . . ) and the corresponding frequency is represented by $f_i$.

The peak extraction section 61 supplies the 10 comparatively high frequency components $A_1$ to $A_{10}$ to the peak addition section 62 and supplies the frequency components $A_1$ to $A_{10}$ and the corresponding frequencies $f_1$ to $f_{10}$ to the peak frequency arithmetic operation section 63.

The peak addition section 62 adds all of the frequency components $A_1$ to $A_{10}$ supplied thereto from the peak extraction section 61 and supplies a resulting sum value $\Sigma A_i$ $(=A_1+A_2+ \ldots +A_{10})$ to the speed feeling arithmetic operation section 64.

The peak frequency arithmetic operation section 63 uses the frequency components $A_1$ to $A_{10}$ and the frequencies $f_1$ to $f_{10}$ supplied thereto from the peak extraction section 61 to arithmetically operate an integrated value $\Sigma A_i \times f_i$ $(=A_1 \times f_1 + A_2 \times f_2 + \ldots + A_{10} \times f_{10})$ which is a sum total of the products of the frequency components $A_i$ and the frequencies $f_i$. Then, the peak frequency arithmetic operation section 63 supplies the integrated value $\Sigma A_i \times f_i$ to the speed feeling arithmetic operation section 64.

The speed feeling arithmetic operation section 64 arithmetically operates a speed feeling S (or information representative of a speed feeling S) based on the sum value $\Sigma A_i$ supplied thereto from the peak addition section 62 and the integrated value $\Sigma A_i \times f_i$ supplied thereto from the peak frequency arithmetic operation section 63. The speed feeling arithmetic operation section 64 supplies the speed feeling S to the tempo correction section 33 and outputs the speed feeling S to the outside.

Figure 4:
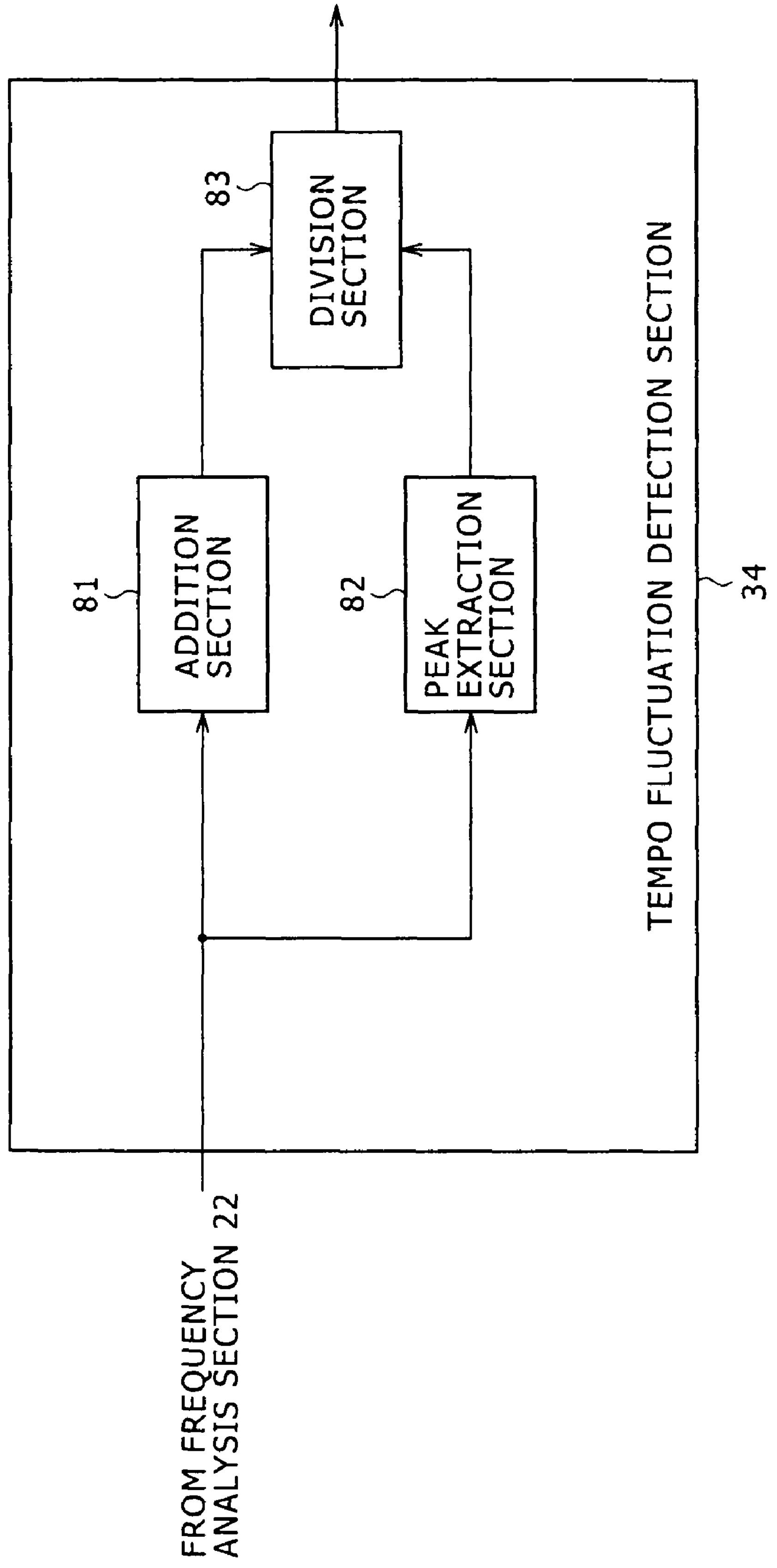
FIG. 4 is a block diagram showing a detailed configuration of a tempo fluctuation detection section shown in FIG. 1.

FIG. 4 shows in block diagram an example of a detailed configuration of the tempo fluctuation detection section 34 shown in FIG. 1.

Referring to FIG. 4, the tempo fluctuation detection section 34 shown includes an addition section 81, a peak extraction section 82 and a division section 83.

The frequency components A of the frequencies corresponding to the range of the tempos 50 to 400 are supplied from the frequency analysis section 22 to the addition section 81. The addition section 81 adds the frequency components A supplied thereto from the frequency analysis section 22 over all of the frequencies and supplies a resulting sum value ΣA to the division section 83.

The frequency components A of the frequencies corresponding to the range of the tempos 50 to 400 from the frequency analysis section 22 are supplied also to the peak extraction section 82. The peak extraction section 82 extracts the maximum frequency component $A_1$ from among the frequency components A and supplies the frequency component $A_1$ to the division section 83.

The division section 83 arithmetically operates a tempo fluctuation W based on the sum value $\Sigma A$ of the frequency components A supplied thereto from the addition section 81 and the maximum frequency component $A_1$ supplied thereto from the peak extraction section 82 and outputs the tempo fluctuation W to the outside.

Now, a feature value detection process performed by the feature value detection apparatus 1 of FIG. 1 is described with reference to a flow chart of FIG. 5. The feature value detection process is started when audio signals of the left and right channels are supplied to the adder 20.

At step S11, the adder 20 adds the audio signals of the left and right channels and supplies a resulting audio signal to the level calculation section 21. Thereafter, the processing advances to step S12.

At step S12, the level calculation section 21 produces a level signal of the audio signal supplied thereto from the adder 20 and supplies the level signal to the frequency analysis section 22.

More particularly, the EQ processing section 41 of the level calculation section 21 removes low frequency components of the audio signal which are not suitable for extraction of the tempo t and supplies the audio signal of frequency components suitable for extraction of the tempo t to the level signal processing sections 42. Then, the level signal production section 42 produces a level signal representative of a transition of the level of the audio signal supplied thereto from the EQ processing section 41 and supplies the level signal to the frequency analysis section 22.

After the process at step S12, the processing advances to step S13, at which the frequency analysis section 22 frequency analyzes the level signal supplied thereto from the level calculation section 21 and outputs frequency components A of individual frequencies of the level signal as a result of the analysis. Then, the frequency analysis section 22 supplies the frequency components A to the tempo calculation section 31, speed feeling detection section 32 and tempo fluctuation detection section 34 of the feature extraction section 23. Thereafter, the processing advances to step S14.

At step S14, the tempo calculation section 31 determines a tempo t of the audio signal based on the frequency components A of the level signal supplied thereto from the frequency analysis section 22 and supplies the tempo t to the tempo correction section 33.

More particularly, the tempo calculation section 31 extracts the maximum frequency component $A_1$ from among the frequency components A of the level signal supplied thereto from the frequency analysis section 22 and determines the frequency of the maximum frequency component $A_1$ as the basic frequency $f_b$ of the level signal. In particular, since each of the frequency components A of the frequencies of the level signal represents a basic frequency likelihood of the frequency as described hereinabove, the frequency of the maximum frequency component $A_1$ is a frequency of a maximum basic frequency likelihood, that is, a frequency which is most likely as the basic frequency. Therefore, the frequency of the maximum frequency component $A_1$ from among the frequency components A of the level signal is determined as the basic frequency $f_b$.

Further, the tempo calculation section 31 determines the tempo t of the original audio signal using the following expression (1) based on the basic frequency $f_b$ and the sampling frequency $f_s$ of the level signal and supplies the tempo t to the tempo correction section 33.

$$t=f_b/f_s\times 60 \quad (1)$$

After the process at step S14, the processing advances to step S15, at which the speed feeling detection section 32 performs a speed feeling detection process based on the frequency components A supplied thereto from the frequency analysis section 22. Then, the speed feeling detection section 32 supplies a speed feeling S of the audio signal obtained by the speed feeling detection process to the tempo correction section 33 and outputs the speed feeling S to the outside.

After the process at step S15, the processing advances to step S16, at which the tempo correction section 33 performs a tempo correction process of correcting the tempo t supplied thereto from the tempo calculation section 31 at step S14 as occasion demands based on the speed feeling S supplied thereto from the speed feeling detection section 32 at step S15. Then, the tempo correction section 33 outputs a tempo t (or information representative of a tempo t) obtained by the tempo correction process to the outside, and then ends the process.

After the process at step S16, the processing advances to step S17, at which the tempo fluctuation detection section 34 performs a tempo fluctuation detection process based on the frequency components A of the level signal supplied thereto from the frequency analysis section 22. Then, the tempo fluctuation detection section 34 outputs a tempo fluctuation W obtained by the tempo fluctuation detection process and representative of the fluctuation of the tempo of the audio signal to the outside. Then, the tempo fluctuation detection section 34 ends the process.

It is to be noted that the tempo t, speed feeling S and tempo fluctuation W outputted to the outside at steps S14 to S16 described above are supplied, for example, to a monitor so that they are displayed on the monitor.

Figure 5:
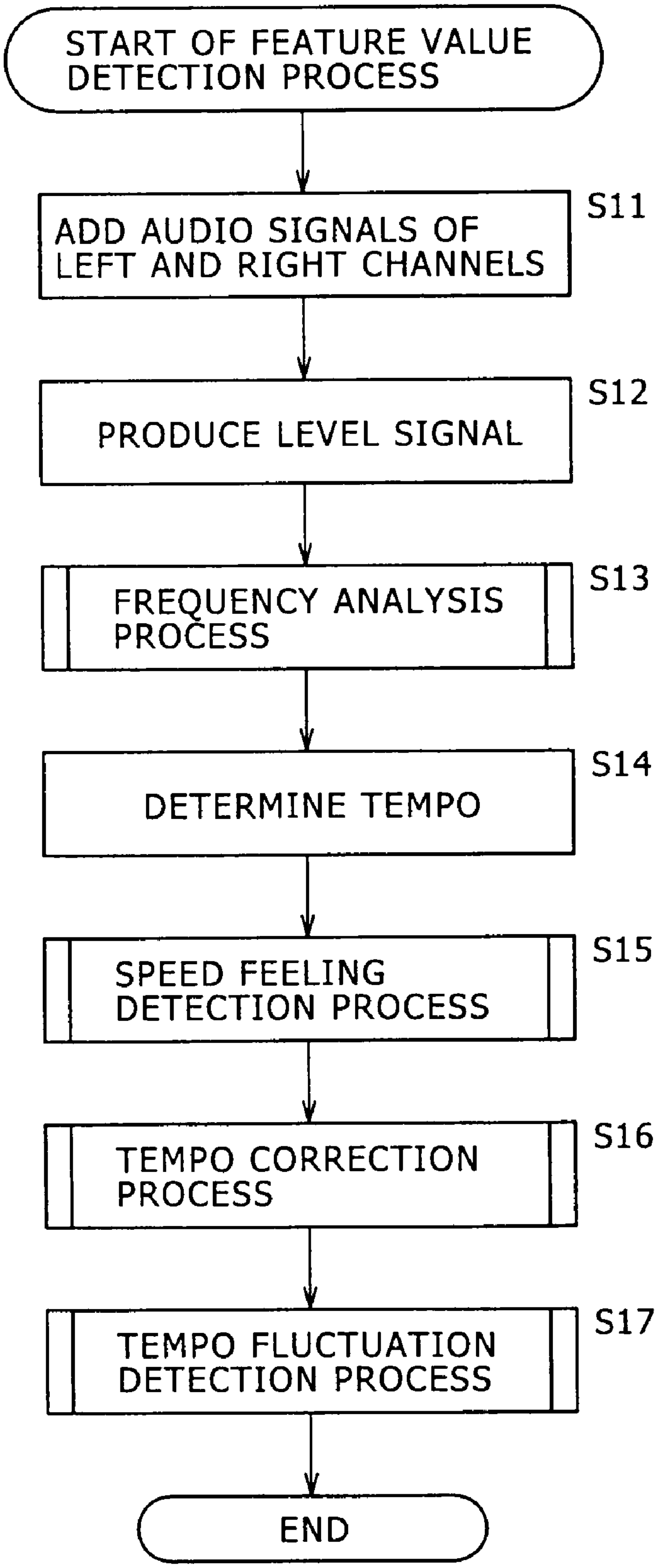
FIG. 5 is a flow chart illustrating a feature value detection process performed by the feature value detection apparatus of FIG. 1.

Now, the frequency analysis process at step S13 of FIG. 5 is described with reference to a flow chart of FIG. 6.

At step S31, the decimation filter section 43 of the frequency analysis section 22 (FIG. 2) removes, in order to allow the down sampling section 44 at the next stage to perform down sampling, high frequency components of the level signal supplied thereto from the level signal production section 42 and supplies the resulting level signal to the down sampling section 44. Thereafter, the processing advances to step S32.

At step S32, the down sampling section 44 performs down sampling of the level signal supplied thereto from the decimation filter section 43 and supplies the level signal after the down sampling to the EQ processing section 45.

After the process at step S32, the processing advances to step S33, at which the EQ processing section 45 performs filter processing of the level signal supplied thereto from the down sampling section 44 to remove low frequency components and high frequency components of the level signal. Then, the EQ processing section 45 supplies the level signal having frequency components remaining as a result of the removal of the low and high frequency components to the window processing section 46, whereafter the processing advances to step S34.

At step S34, the window processing section 46 extracts, from the level signal supplied thereto from the EQ processing section 45, a predetermined number of samples in a time series as the level signal of one block, and performs a window process for the level signal of the block and supplies the resulting level signal to the frequency conversion section 47. It is to be noted that processes at the succeeding steps S34 to S36 are performed in a unit of a block.

After the process at step S34, the processing advances to step S35, at which the frequency conversion section 47 performs discrete cosine transform for the level signal of the block supplied thereto from the window processing section 46 thereby to perform frequency conversion of the level signal. Then, the frequency conversion section 47 obtains, from among frequency components obtained by the frequency conversion of the level signal of the block, those frequency components which have frequencies corresponding to, for example, the tempos 50 to 1,600 and supplies the frequency components to the frequency component processing section 48.

After the process at step S35, the processing advances to step S36, at which the frequency component processing section 48 processes the frequency components of the level signal of the block from the frequency conversion section 47. In particular, the frequency component processing section 48 adds, to the frequency components of the frequencies corresponding to, for example, the tempos 50 to 400 from among the frequency components of the level signal of the block from the frequency conversion section 47, frequency components (harmonics) of the frequencies corresponding to the tempos equal to twice, three times and four times the tempos, respectively. Then, the frequency component processing section 48 determines the sum values as new frequency components and thereby obtains frequency components of the frequencies corresponding to the range of the tempos 50 to 400, and supplies the frequency components to the statistic processing section 49.

After the process at step S36, the processing advances to step S37, at which the statistic processing section 49 decides whether or not frequency components of the level signal of blocks for one tune are received from the frequency component processing section 48. If it is decided that frequency components of the level signal of blocks for one tune are not received as yet, then the processing returns to step S34. Then at step S34, the window processing section 46 extracts, from within the level signal succeeding the level signal extracted as one block, the level signal for one block and performs a window process for the extracted level signal for one block. Then, the window processing section 46 supplies the level signal of the block after the window process to the frequency conversion section 47, whereafter the processing advances to step S35 so that the processes described above are repeated.

It is to be noted that the window processing section 46 may extract the level signal for one block from a point of time immediately after the block extracted at step S34 in the immediately preceding cycle and perform a window process for the extracted level signal for one block or may otherwise extract the level signal for one block such that the level signal for one block overlaps with the level signal of a block extracted at step S34 in the immediately preceding cycle and perform a window process for the extracted level signal.

If it is decided at step S37 that frequency components of the level signal of blocks for one tune are received, then the processing advances to step S38, at which the statistic processing section 49 performs a statistic process for the blocks for one tune. In particular, the statistic processing section 49 adds the frequency components of the level signal for one tune successively supplied thereto in a unit of a block from the frequency component processing section 48 for the individual frequencies. Then, the statistic processing section 49 supplies frequency components A of the frequencies of the level signal for one tune obtained by the statistic process to the feature extraction section 23, whereafter the processing returns to step S13 of FIG. 5.

After the process at step S13 of FIG. 5, the processing advances to step S14, at which the tempo calculation section 31 uses the frequency of the maximum frequency component $A_1$ from among the frequency components A obtained by the statistic process of the frequency components of the level signal of the blocks for one tune supplied thereto from the statistic processing section 49 as the basic frequency $f_b$ of the level signal to determine the tempo t in accordance with the expression (1) given hereinabove. Consequently, the tempo t of the audio signal corresponding to one tune can be determined with a high degree of accuracy.

Now, the frequency analysis process of the frequency analysis section 22 is described with reference to FIGS. 7A to 7E and 8.

Figure 6:
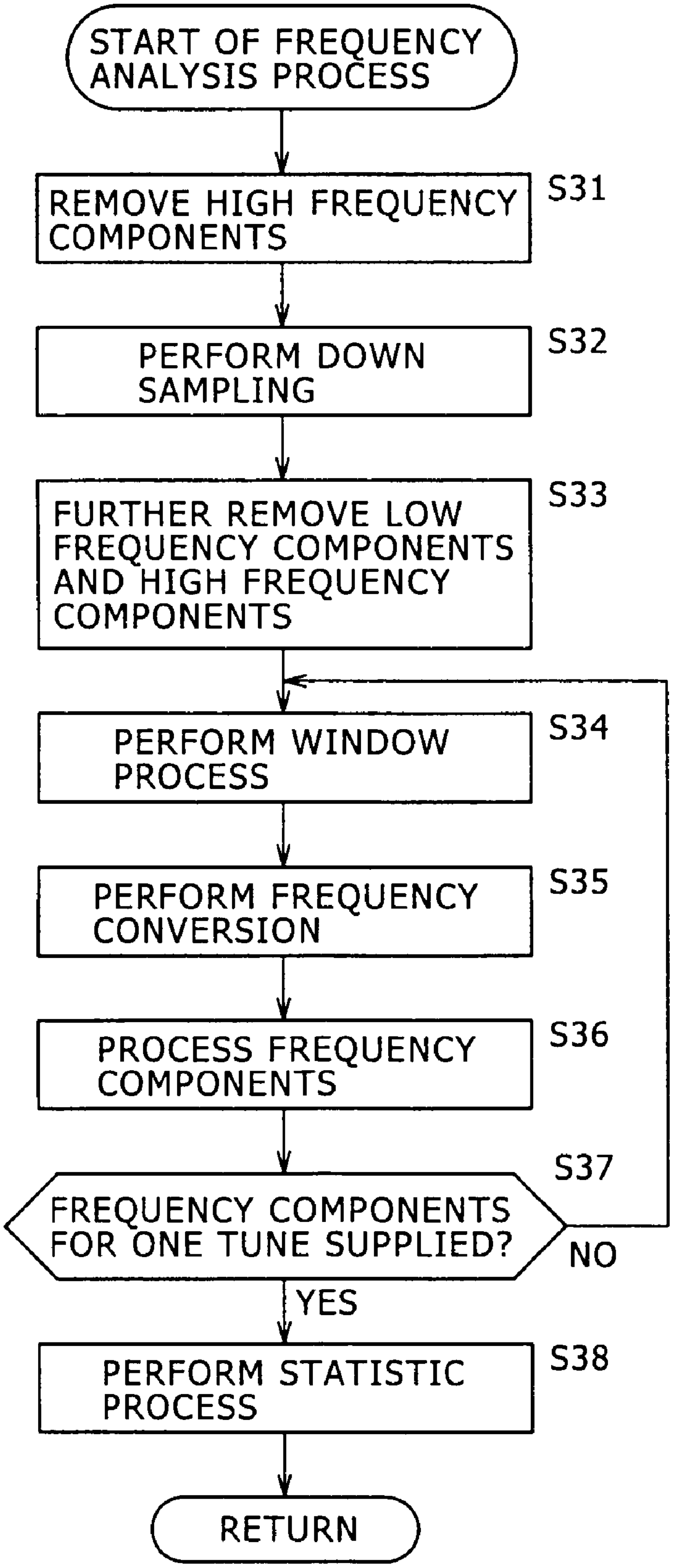
FIG. 6 is a flow chart illustrating a frequency analysis process at step S13 of FIG. 5.
Figures 7A, 7B, 7C, 7D, 7E:
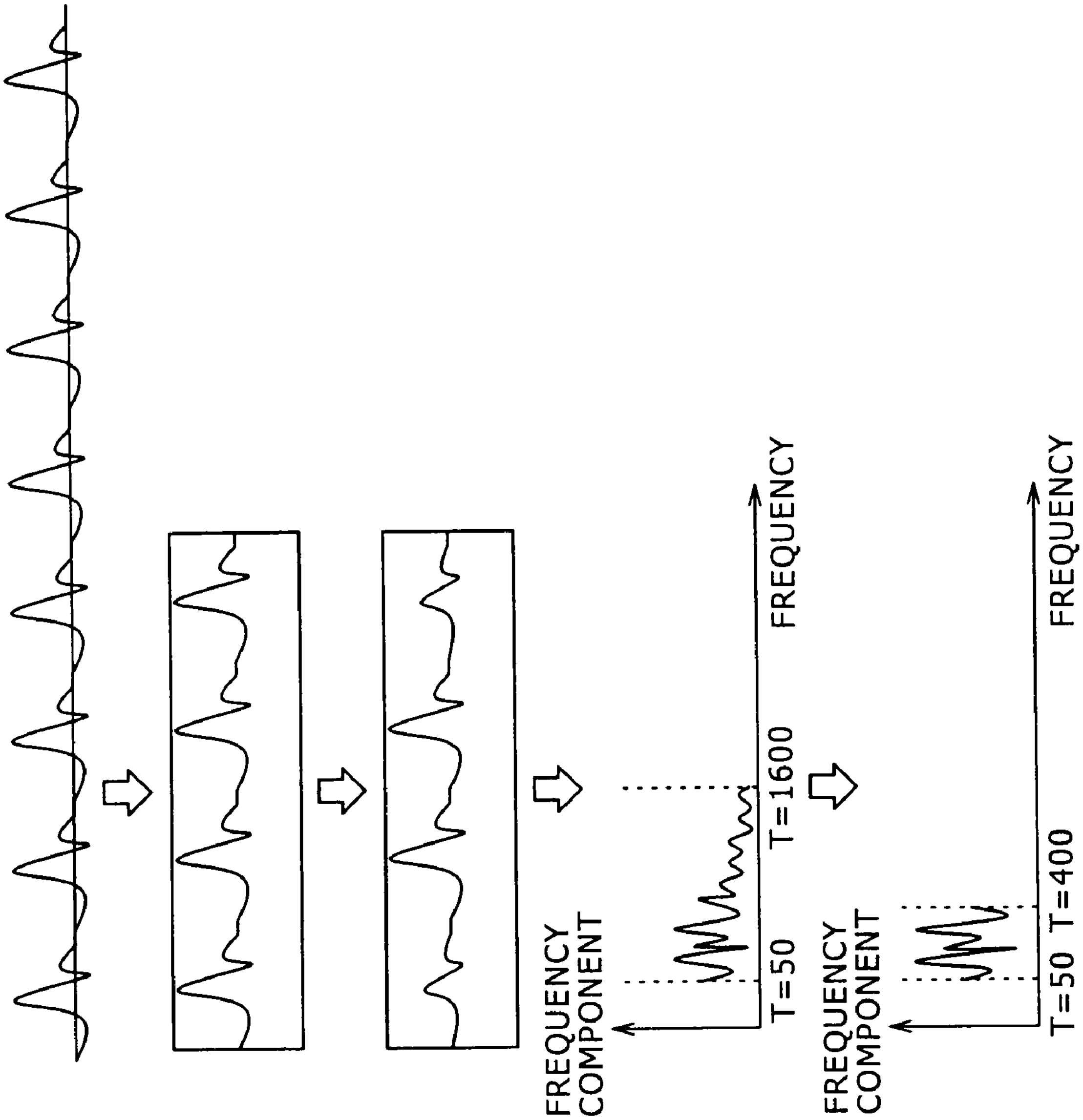
FIGS. 7A to 7E and 8 are waveform diagrams illustrating the frequency analysis process of a frequency analysis section shown in FIG. 1.

If a level signal illustrated in FIG. 7A is supplied from the EQ processing section 45 to the window processing section 46 in the frequency analysis section 22, then the window processing section 46 extracts the level signal for one block as seen in FIG. 7B at step S34 of FIG. 6. In particular, the window processing section 46 extracts a predetermined number of samples from the level signal illustrated in FIG. 7A as the level signal of one block. Then, the window processing section 46 performs a window process for the level signal of the block illustrated in FIG. 7B (or multiplies the level signal of the block by a predetermined window function) to obtain a level signal illustrated in FIG. 7C wherein opposite end portions of the block are attenuated.

The level signal of the block illustrated in FIG. 7C is supplied from the window processing section 46 to the frequency conversion section 47. Then at step S35 of FIG. 6, the frequency conversion section 47 discrete cosine transforms the level signal to obtain frequency components of frequencies corresponding to the range of the tempos 50 to 1,600 as seen in FIG. 7D. It is to be noted that, in FIG. 7D, the axis of abscissa indicates the frequency and the axis of ordinate indicates the frequency component. "T=50" indicated on the axis of abscissa represents the value of a frequency corresponding to the tempo 50, and "T=1600" represents the value of a frequency corresponding to the tempo 1,600.

The frequency components of the frequencies corresponding to the range from the tempo 50 to the tempo 1,600 illustrated in FIG. 7D are supplied from the frequency conversion section 47 to the frequency component processing section 48. Thus, at step S36 of FIG. 6, the frequency component processing section 48 adds, to the frequency components of the frequencies corresponding to the tempos 50 to 400, frequency components (harmonics) of frequencies corresponding to tempos equal to twice, three times and four times the tempos, respectively. Then, the frequency component processing section 48 determines the sum values newly as frequency components of the frequencies corresponding to the tempos. Consequently, frequency components of the frequencies corresponding to the range of the tempos 50 to 400 are obtained as seen in FIG. 7E. It is to be noted that, in FIG. 7E, the axis of abscissa indicates the frequency and the axis of ordinate indicates the frequency component similarly as in FIG. 7D. Further, "T=50" indicated on the axis of abscissa represents the value of a frequency corresponding to the tempo 50, and "T=400" indicates the value of a frequency corresponding to the tempo 400.

Figure 8:
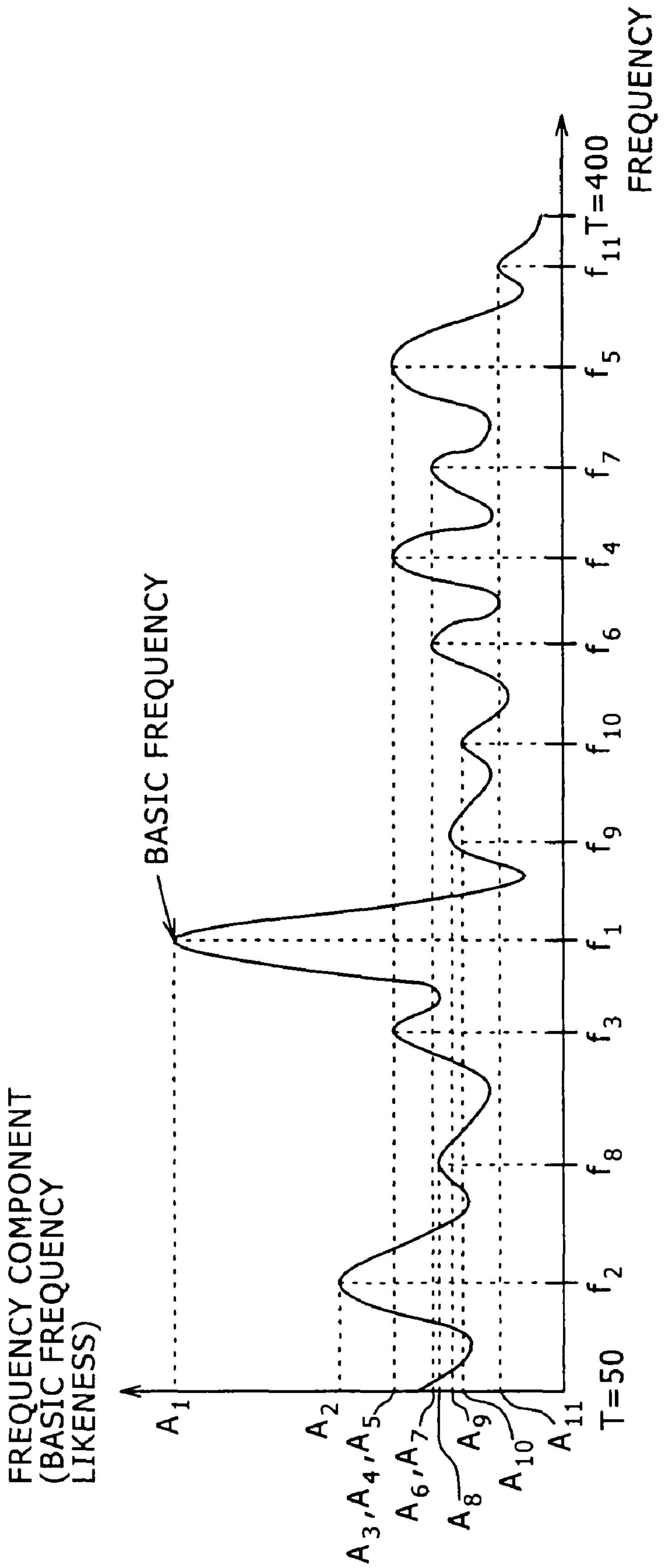

When such processes as described above are performed for the level signal of blocks for one tune and the frequency components of the frequencies illustrated in FIG. 7E regarding the level signal of blocks for one tune are supplied from the frequency component processing section 48 to the statistic processing section 49, the statistic processing section 49 adds, at step S38 of FIG. 6, the frequency components illustrated in FIG. 7E regarding the level signal of the blocks for one tune thereby to obtain, for example, frequency components A illustrated in FIG. 8 regarding the audio signal of one tune.

The frequency components A of FIG. 8 include 11 peaks (maximum values) $A_1$ to $A_{11}$. Here, of the eleven peaks $A_1$ to $A_{11}$, ten comparatively high peaks in the descending order are the frequency components $A_1$ to $A_{10}$, and the corresponding frequencies are frequencies $f_1$ to $f_{10}$, respectively. Then, the maximum frequency component is the frequency component $A_1$.

In this instance, at step S14 of FIG. 5, the frequency $f_1$ of the frequency component $A_1$ is determined as the basic frequency $f_b$ of the level signal, and the tempo t of the overall audio signal of one tune is determined in accordance with the expression (1) given hereinabove.

Figure 9:
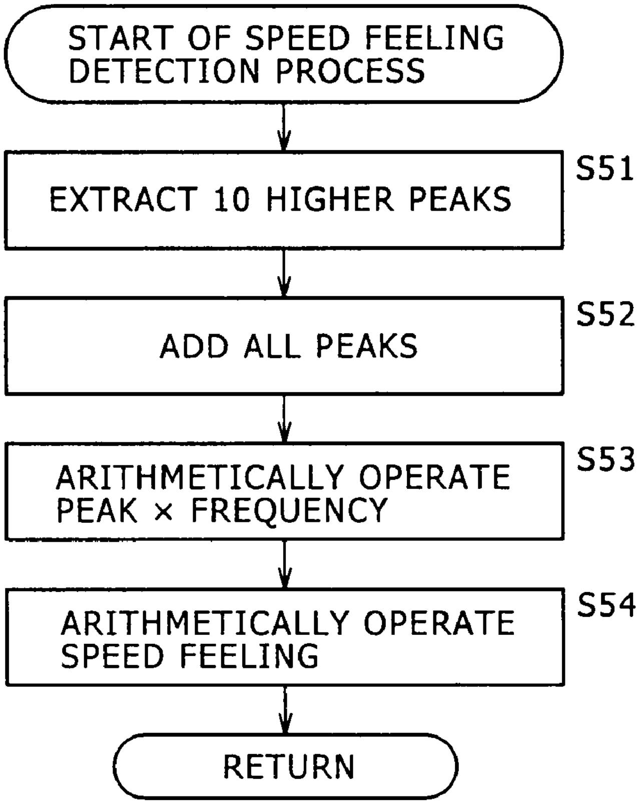
FIG. 9 is a flow chart illustrating a speed feeling detection process at step S15 of FIG. 5.

Now, the speed feeling detection process at step S15 of FIG. 5 is described with reference to a flow chart of FIG. 9.

At step S51, the peak extraction section 61 of the speed feeling detection section 32 of FIG. 3 extracts, from the frequency components A of the level signal supplied thereto from the statistic processing section 49 (FIG. 2) at step S38 of FIG. 6, those frequency components which each forms a peak, and further extracts, from the extracted frequency components, ten frequency components $A_1$ to $A_{10}$ having comparatively high peaks in the descending order. Then, the peak extraction section 61 supplies the ten comparatively high frequency components $A_1$ to $A_{10}$ to the peak addition section 62, and supplies the frequency components $A_1$ to $A_{10}$ and the corresponding frequencies $f_1$ to $f_{10}$ to the peak frequency arithmetic operation section 63.

For example, if the frequency components A illustrated in FIG. 8 are supplied from the statistic processing section 49 to the speed feeling detection section 32, then the peak extraction section 61 extracts, from among the peaks $A_1$ to $A_{11}$ which each forms a peak, the frequency components $A_1$ to $A_{10}$ which form ten comparatively high peaks in the descending order. Then, the frequency components $A_1$ to $A_{10}$ are supplied to the peak addition section 62, and the frequency components $A_1$ to $A_{10}$ and the frequencies $f_1$ to $f_{10}$ are supplied to the peak frequency arithmetic operation section 63.

After the process at step S51, the processing advances to step S52, at which the peak addition section 62 adds all of the frequency components $A_1$ to $A_{10}$ supplied thereto from the peak extraction section 61 and supplies a sum value $\Sigma A_i$ $(=A_1+A_2+ \ldots +A_{10})$ to the speed feeling arithmetic operation section 64.

After the process at step S52, the processing advances to step S53, at which the peak frequency arithmetic operation section 63 uses the frequency components $A_1$ to $A_{10}$ and the frequencies $f_1$ to $f_{10}$ supplied thereto from the peak extraction section 61 to arithmetically operate an integrated value $\Sigma A_i \times f_i$ $(=A_1 \times f_1+A_2 \times f_2+ \ldots +A_{10} \times f_{10})$ which is the sum total of the products of the frequency components $A_i$ and the frequencies $f_i$. Then, the peak frequency arithmetic operation section 63 supplies the integrated value $\Sigma A_i \times f_i$ to the speed feeling arithmetic operation section 64.

After the process at step S53, the processing advances to step S54, at which the speed feeling arithmetic operation section 64 arithmetically operates a speed feeling S (or information representative of a speed feeling S) based on the sum values $\Sigma A_i$ supplied thereto from the peak addition section 62 and the integrated value $\Sigma A_i \times f_i$ supplied thereto from the peak frequency arithmetic operation section 63. Then, the speed feeling arithmetic operation section 64 supplies the speed feeling S to the tempo correction section 33 and outputs the speed feeling S to the outside. Then, the speed feeling arithmetic operation section 64 returns the processing to step S16 of FIG. 5.

In particular, the speed feeling arithmetic operation section 64 uses the following expression (2) to arithmetically operate a speed feeling S and supplies the speed feeling S to the tempo correction section 33.

$$S = \frac{\sum_{i=1}^{10} A_i \times f_i}{\sum_{i=1}^{10} A_i} = \frac{A_i}{\sum_{i=1}^{10} A_i} \times f_1 + \frac{A_2}{\sum_{i=1}^{10} A_i} \times f_2 + \ldots + \frac{A_{10}}{\sum_{i=1}^{10} A_i} \times f_{10} \quad (2)$$

In the expression (2) above, each of the frequencies $f_i$ of the frequency components which each forms a peak is weighted in accordance with the magnitude of the frequency component $A_i$ of the peak, and the weighted frequencies $f_i$ are added. Accordingly, the speed feeling S determined using the expression (2) exhibits a high value where comparatively high peaks of the frequency components $A_i$ exist much on the high frequency side, but exhibits a low value where comparatively high peaks of the frequency components $A_i$ exist much on the low frequency side.

The speed feeling S determined using the expression (2) is further described with reference to FIGS. 10 and 11.

Figure 10:
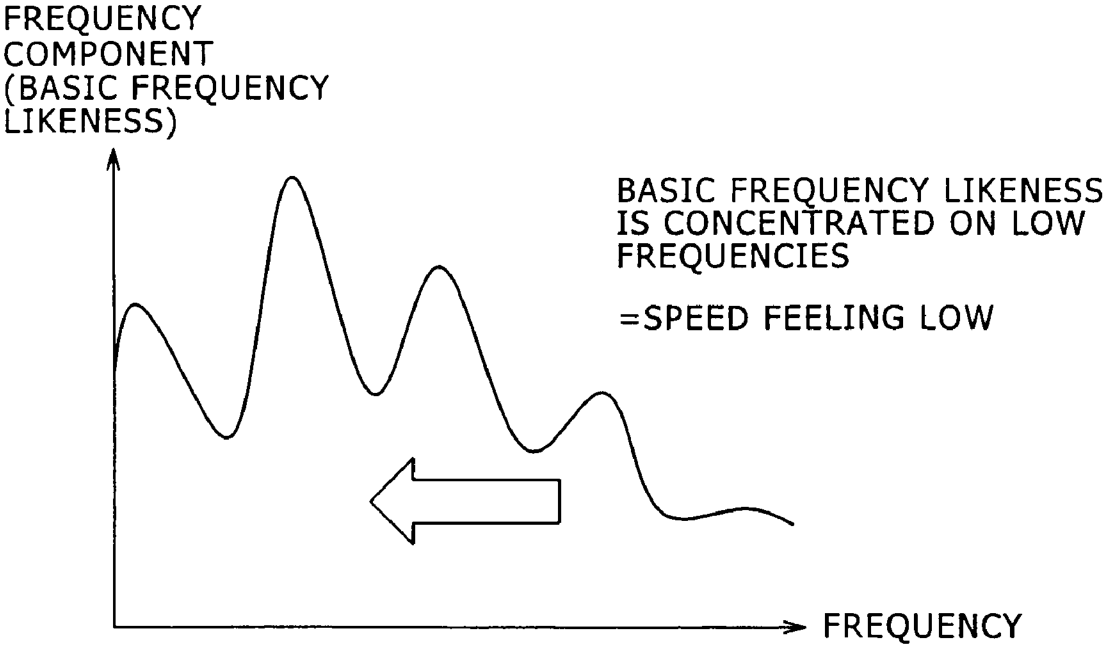
FIGS. 10 and 11 are diagrams illustrating different examples of frequency components of an audio signal of one tune obtained by the frequency analysis section shown in FIG. 1.
Figure 11:
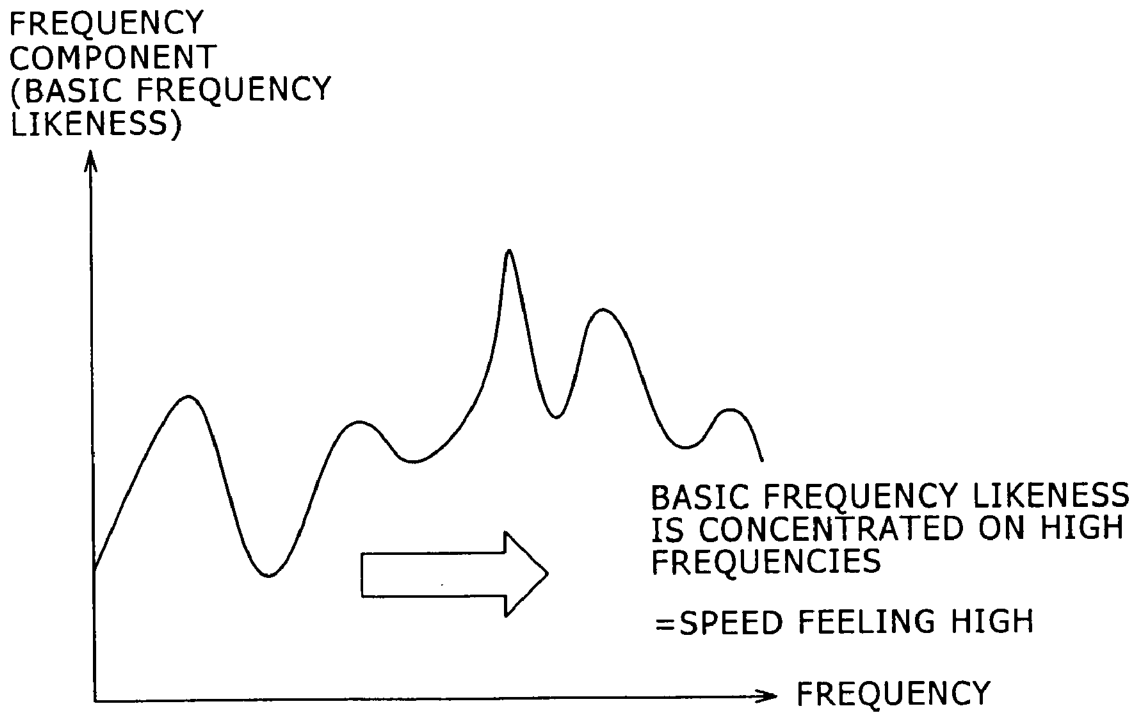

FIGS. 10 and 11 illustrate an example of the frequency components A of the audio signal of one tune obtained by the frequency analysis section 22. It is to be noted that, in FIGS. 10 and 11, the axis of abscissa indicates the frequency, and the axis of ordinate indicates the frequency component (basic frequency likelihood).

In the case of an audio signal which does not have a speed feeling (a slow audio signal), the frequency components A of the level signal are one-sided to the low frequency side as seen in FIG. 10. In this instance, according to the expression (2), a speed feeling S having a low value is obtained.

On the other hand, in the case of an audio signal which has a speed feeling (a fast audio signal), the frequency components A of the level signal are one-sided to the high frequency side as seen in FIG. 11. In this instance, according to the expression (2), a speed feeling S having a high value is obtained.

Accordingly, according to the expression (2), a value corresponding to a speed feeling of the audio signal is obtained.

Figure 12:
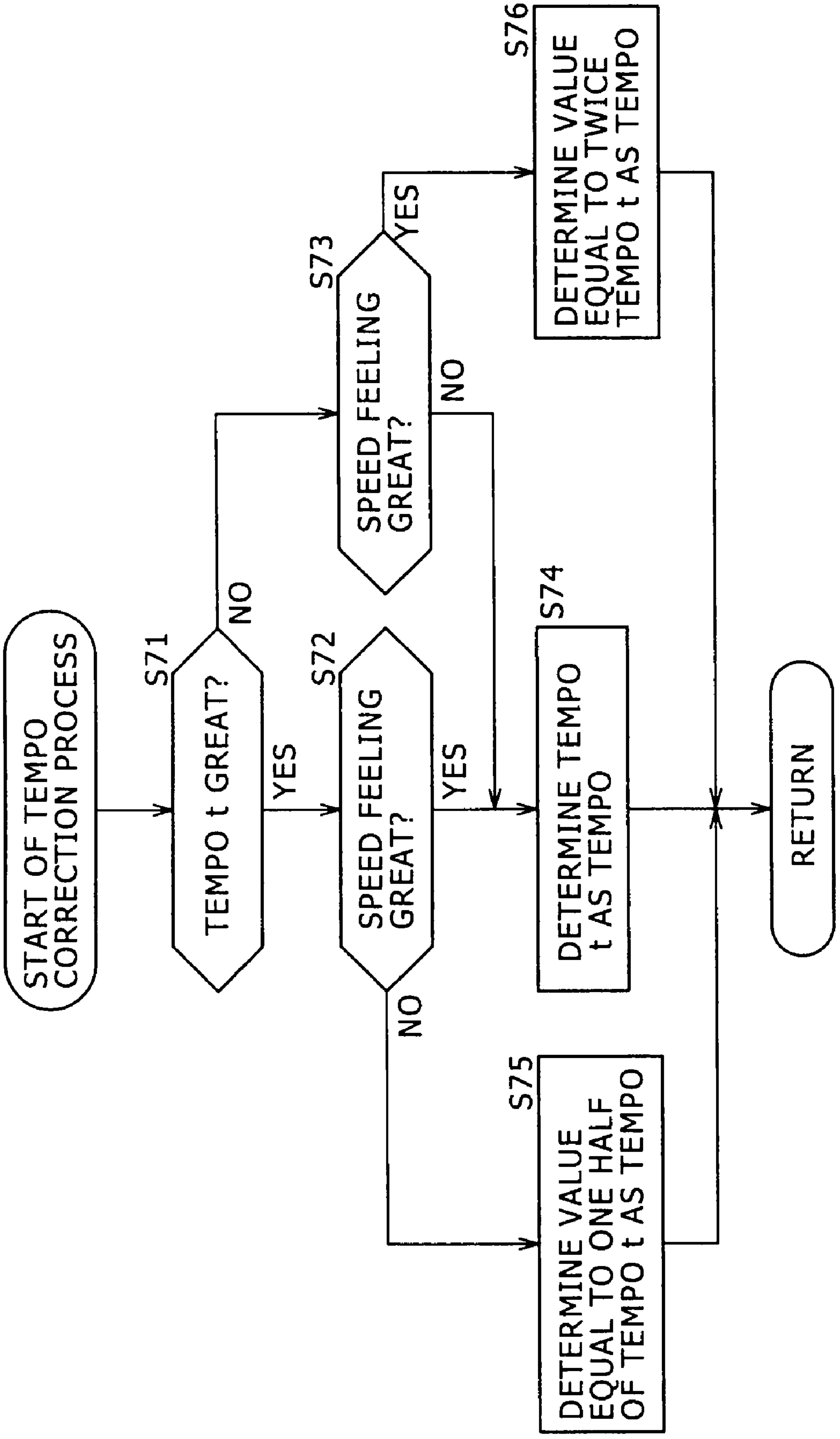
FIG. 12 is a flow chart illustrating a tempo correction process at step S16 of FIG. 5.

Now, the tempo correction process at step S16 of FIG. 5 is described with reference to a flow chart of FIG. 12.

At step S71, the tempo correction section 33 decides whether or not the tempo t supplied thereto from the tempo calculation section 31 (FIG. 1) at step S14 of FIG. 5 is higher than a predetermined value (threshold value) TH1. It is to be noted that the predetermined value TH1 is set, for example, upon manufacture of the feature value detection apparatus 1, by a manufacturer of the feature value detection apparatus 1.

If it is decided at step S71 that the tempo t from the tempo calculation section 31 is higher than the predetermined value TH1, that is, when the tempo t from the tempo calculation section 31 is fast, the processing advances to step S72. At step S72, the tempo correction section 33 decides whether or not the speed feeling S supplied from the speed feeling detection section 32 at step S54 of FIG. 9 is higher than a predetermined value (threshold value) TH2. It is to be noted that the predetermined value TH2 is set, for example, upon manufacture of the feature value detection apparatus 1, by a manufacturer of the feature value detection apparatus 1.

If it is decided at step S72 that the speed feeling S from the speed feeling detection section 32 is higher than the predetermined value TH2, that is, if a process result that both of the tempo t and the speed feeling S are high is obtained with regard to the original audio signal, then the processing advances to step S74.

If it is decided at step S71 that the tempo t from the tempo calculation section 31 is not higher than the predetermined value TH1, that is, when the tempo t from the tempo calculation section 31 is slow, the processing advances to step S73. At step S73, it is decided whether or not the speed feeling S supplied thereto from the speed feeling detection section 32 at step S54 of FIG. 9 is higher than a predetermined value TH3 similarly as at step S72.

It is to be noted that the predetermined value TH3 is set, for example, upon manufacture of the feature value detection apparatus 1, by a manufacturer of the feature value detection apparatus 1. Further, the values of the predetermined values TH2 and TH3 may be equal to each other or may be different from each other.

If it is decided at step S73 that the speed feeling S from the tempo calculation section 31 is not higher than the predetermined value TH3, that is, if a processing result that both of the tempo t and the speed feeling S are low is obtained with regard to the original audio signal, then the processing advances to step S74.

At step S74, the tempo correction section 33 determines the tempo t from the tempo calculation section 31 as it is as a tempo of the audio signal. In particular, if it is decided at step S72 that the speed feeling S is high, then since it is decided that the tempo t from the tempo calculation section 31 is fast and the speed feeling S from the speed feeling detection section 32 is high, it is determined that the tempo t from the tempo calculation section 31 is reasonable from comparison thereof with the speed feeling S. Thus, at step S74, the tempo t from the tempo calculation section 31 is finally determined as it is as the tempo of the audio signal.

On the other hand, if it is decided at step S73 that the speed feeling S is not high, since it is decided that the tempo t from the tempo calculation section 31 is slow and the speed feeling S from the speed feeling detection section 32 is low, it is still determined that the tempo t from the tempo calculation section 31 is reasonable from comparison thereof with the speed feeling S. Consequently, at step S74, the tempo t from the tempo calculation section 31 is finally determined as it is as the tempo of the audio signal. After the tempo calculation section 31 determines the tempo, the processing returns to step S16 of FIG. 5.

If it is decided at step S72 that the speed feeling S from the speed feeling detection section 32 is not higher than the predetermined value TH2, that is, if a processing result that the tempo t from the tempo calculation section 31 is fast but the speed feeling S from the speed feeling detection section 32 is low is obtained with regard to the original audio signal, then the processing advances to step S75.

At step S75, the tempo correction section 33 determines a value of, for example, one half the tempo t from the tempo calculation section 31 as the tempo t of the audio signal. In particular, in the present case, since it is decided that the tempo t from the tempo calculation section 31 is fast but the speed feeling S from the speed feeling detection section 32 is low, the tempo t from the tempo calculation section 31 does not correspond to the speed feeling S from the speed feeling detection section 32. Therefore, the tempo correction section 33 corrects the tempo t from the tempo calculation section 31 to a value equal to one half the tempo t and determines the corrected value as the tempo of the audio signal. After the tempo correction section 33 determines the tempo, the processing returns to step S16 of FIG. 5.

If it is decided at step S73 that the speed feeling S from the speed feeling detection section 32 is higher than the predetermined value TH3, that is, if it is decided that the tempo t from the tempo calculation section 31 is slow but the speed feeling S from the speed feeling detection section 32 is high is obtained with regard to the original audio signal, then the processing advances to step S76.

At step S76, the tempo correction section 33 determines a value of, for example, twice the tempo t from the tempo calculation section 31 as the tempo t of the audio signal. In particular, in the present case, since it is decided that the tempo t from the tempo calculation section 31 is slow but the speed feeling S from the speed feeling detection section 32 is high, the tempo t from the tempo calculation section 31 does not correspond to the speed feeling S from the speed feeling detection section 32. Therefore, the tempo correction section 33 corrects the tempo t from the tempo calculation section 31 to a value equal to twice the tempo t and determines the corrected value as the tempo of the audio signal. After the tempo correction section 33 determines the tempo, the processing returns to step S16 of FIG. 5.

As described above, since, at steps S74 to S76 of FIG. 12, the tempo correction section 33 corrects the tempo t from the tempo calculation section 31 based on the speed feeling S from the speed feeling detection section 32, the accurate tempo t which corresponds to the speed feeling S can be obtained.

Figure 13:
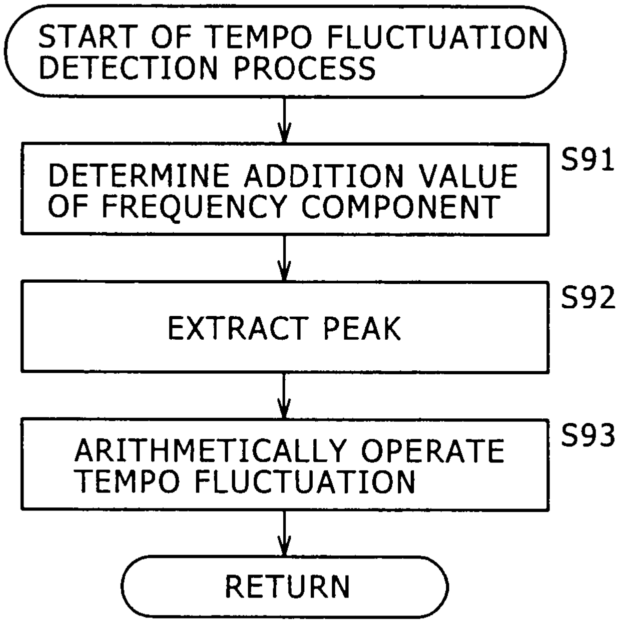
FIG. 13 is a flow chart illustrating a tempo fluctuation detection process at step S17 of FIG. 5.

Now, the tempo fluctuation detection process executed at step S17 of FIG. 5 by the tempo fluctuation detection section 34 of FIG. 4 is described with reference to a flow chart of FIG. 13.

At step S91, the addition section 81 adds the frequency components A of the frequencies corresponding to the range of the temps 50 to 400 supplied thereto from the frequency analysis section 22 at step S38 of FIG. 6 over all of the frequencies and supplies a resulting sum value ΣA to the division section 83.

At step S92 after the process at step S91, the peak extraction section 82 extracts, from among the frequency components A of the frequencies corresponding to the range of the tempos 50 to 400 supplied thereto from the frequency analysis section 22 at step S38 of FIG. 6, the maximum frequency component $A_1$ and supplies the frequency component $A_1$ to the division section 83.

After the process at step S92, the processing advances to step S93, at which the division section 83 arithmetically operates a tempo fluctuation W based on the sum value ΣA of the frequency components A supplied thereto from the addition section 81 and the maximum frequency component $A_1$ supplied thereto from the peak extraction section 82 and outputs the tempo fluctuation W to the outside.

More particularly, the division section 83 arithmetically operates the tempo fluctuation W using the following expression (3):

$$W = \frac{\sum A}{A_1} \tag{3}$$

According to the expression (3), the tempo fluctuation W represents a ratio of the sum value ΣA of the frequency components to the maximum frequency component $A_1$. Accordingly, the tempo fluctuation W determined using the expression (3) exhibits a low value where the frequency component $A_1$ is much greater than the other frequency components A, but exhibits a high value where the frequency component $A_1$ is not much greater than the other frequency components A.

Now, the speed feeling S determined using the expression (3) is described with reference to FIGS. 14 and 15.

Figure 14:
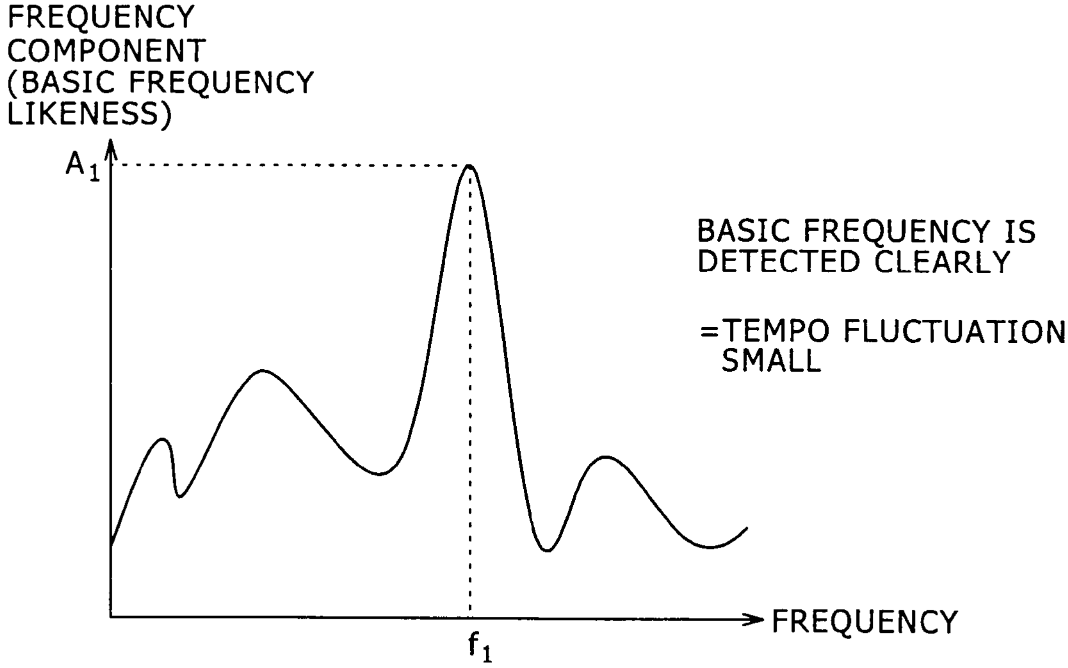
FIGS. 14 and 15 are diagrams illustrating different examples of frequency components of an audio signal of one tune obtained by the frequency analysis section shown in FIG. 1.
Figure 15:
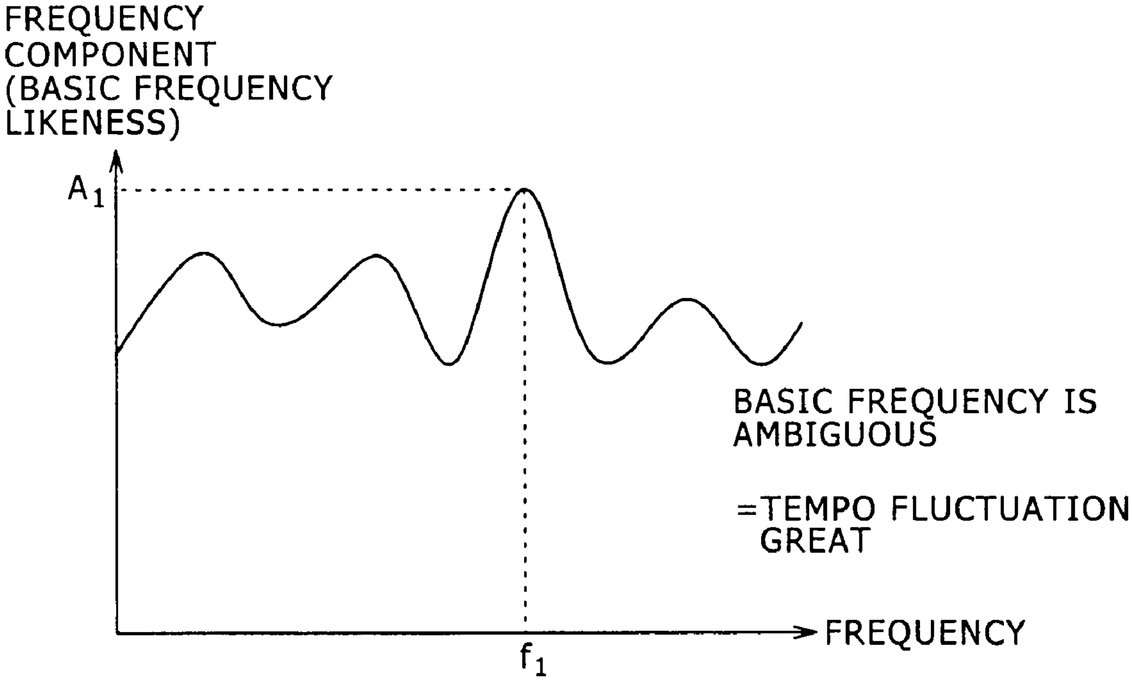

FIGS. 14 and 15 illustrate an example of the frequency components A regarding an audio signal of one tune obtained by the frequency analysis section 22. It is to be noted that the axis of abscissa indicates the frequency and the axis of ordinate indicates the frequency component (basic frequency likelihood).

In the case of an audio signal whose tempo fluctuation is small, that is, in the case of an audio signal whose tempo varies little, the maximum frequency component $A_1$ of the level signal of the audio signal is outstandingly greater than the other frequency components A as seen in FIG. 14. In this instance, according to the expression (3) above, a tempo fluctuation W of a low value is determined.

On the other hand, in the case of an audio signal whose tempo fluctuation is great, the maximum frequency component $A_1$ of the level signal thereof is not outstandingly greater than the other frequency components A as seen in FIG. 15. In this instance, according to the expression (3), a tempo fluctuation W having a high value is obtained.

Accordingly, according to the expression (3), a tempo fluctuation W of a value which corresponds to the degree of variation of the tempo of the audio signal can be determined.

As described above, according to the feature value detection apparatus 1, since a level signal of an audio signal is determined and frequency analyzed and the tempo t is determined based on a result of the frequency analysis, the tempo t can be detected with a high degree of accuracy.

Further, if the tempo t or the tempo fluctuation W outputted from the feature value detection apparatus 1 is used, then it is possible to recommend music (a tune) to the user.

For example, an audio signal of classic music or a live performance usually has a slow tempo t and has a great tempo fluctuation W. On the other hand, for example, an audio signal of music in which an electronic drum is used usually has a fast tempo t and a small tempo fluctuation W.

Accordingly, it is possible to identify a genre and so forth of an audio signal based on the tempo t and/or the tempo fluctuation W and recommend a tune of a desirable genre to the user.

It is to be noted that, while the tempo correction section 33 in the present embodiment corrects the tempo t determined by the frequency analysis of the level signal of the audio signal based on the speed feeling S of the audio signal, the correction of the tempo t may otherwise be performed for a tempo obtained by any method.

Further, while, in the feature value detection apparatus 1, the adder 20 adds audio signals of the left channel and the right channel in order to moderate the load of processing, a feature value detection process can be performed for each channel without adding the audio signals of the left and right channels. In this instance, such feature values as the tempo t, speed feeling S or tempo fluctuation W can be detected with a high degree of accuracy for each of the audio signals of the left and right channels.

Further, while the feature value detection apparatus 1 uses discrete cosine transform for the frequency analysis of a level signal, for example, a comb filter, a short-time Fourier analysis, wavelet conversion and so forth can be used for the frequency analysis of a level signal.

Further, in the feature value detection apparatus 1, processing for an audio signal can be performed such that the audio signal is band divided into a plurality of audio signals of different frequency bands and the processing is performed for each of the audio signals of the individual frequency bands. In this instance, the tempo t, speed feeling S and tempo fluctuation W can be detected with a higher degree of accuracy.

Further, the audio signal may not be a stereo signal but be a monaural signal.

Further, while the statistic processing section 49 performs a statistic process for blocks for one tune, the statistic process may be performed in a different manner, for example, for some of blocks of one tune.

Further, the frequency conversion section 47 may perform discrete cosine transform for the overall level signal of one tune.

Further, while, in the present embodiment, an audio signal in the form of a digital signal is inputted, it is otherwise possible to input an audio signal in the form of an analog signal. It is to be noted, however, that, in this instance, it is necessary to provide an A/D (Analog/Digital) converter, for example, at a preceding stage to the adder 20 or between the adder 20 and the level calculation section 21.

Furthermore, the arithmetic operation expression for the speed feeling S is not limited to the expression (2). Similarly, also the arithmetic operation expression for the tempo fluctuation W is not limited to the expression (3).

Further, while, in the present embodiment, the tempo t, speed feeling S and tempo fluctuation W are determined as feature values of an audio signal, it is possible to determine some other feature value such as the beat.

While the series of processes described above can be executed by hardware for exclusive use, it may otherwise be executed by software. Where the series of processes is executed by software, a program which constructs the software is installed into a computer for universal use or the like.

Figure 16:
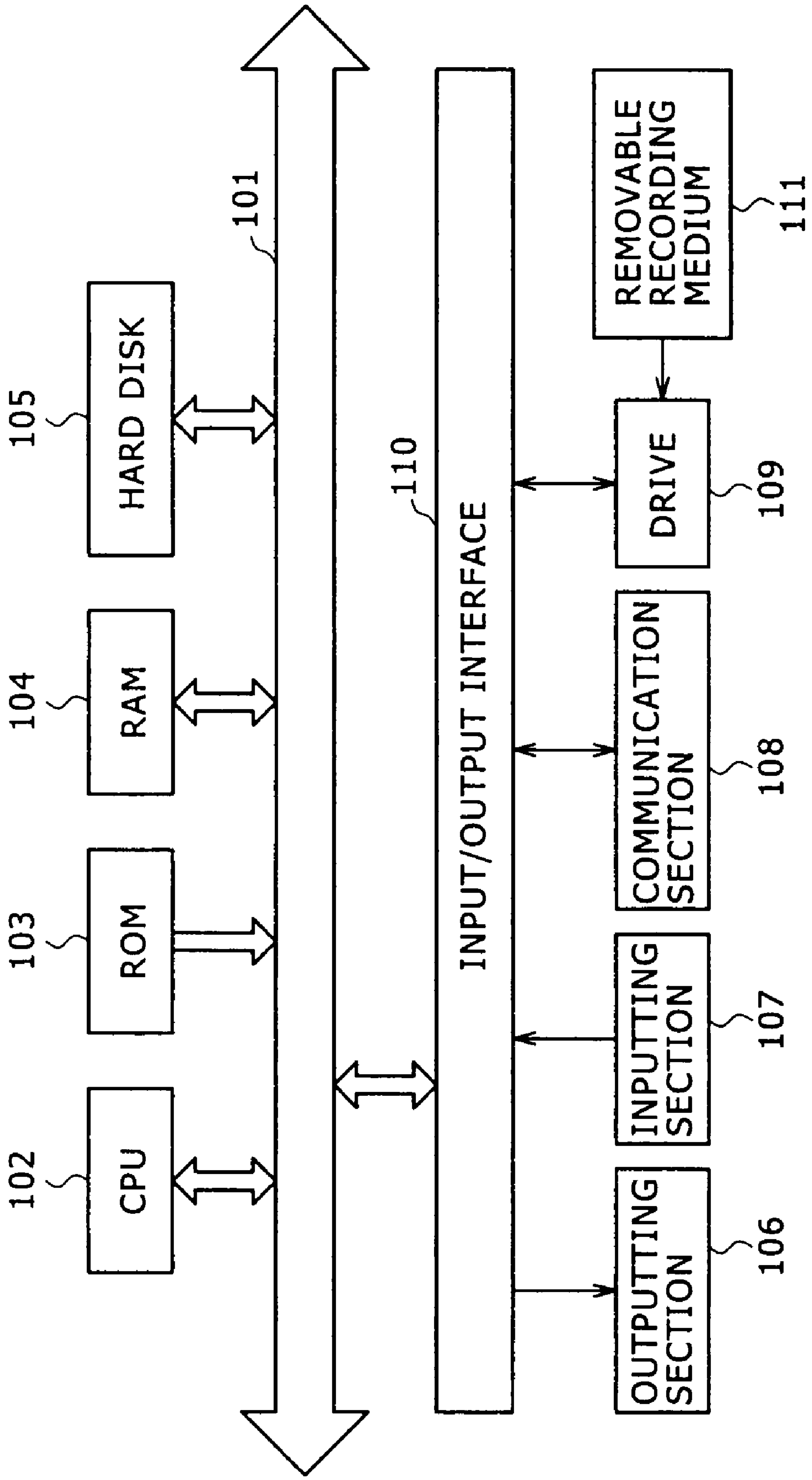
FIG. 16 is a block diagram showing an example of a configuration of a computer to which the present invention is applied.

FIG. 16 shows an example of a configuration of a form of a computer into which a program for executing the series of processes described above is to be installed.

The program can be recorded in advance on a hard disk 105 or in a ROM 103 as a recording medium built in the computer.

Or, the recording medium may be stored (recorded) temporarily or permanently on a removable recording medium 111 such as a flexible disk, a CD-ROM (Compact Disc-Read Only Memory), an MO (Magneto-Optical) disk, a DVD (Digital Versatile Disc), a magnetic disk or a semiconductor memory. Such a removable recording medium 111 as just described can be provided as package software.

It is to be noted that the program may not only be installed from such a removable recording medium 111 as described above into the computer but also be transferred from a download site by radio communication into the computer through an artificial satellite for digital satellite broadcasting or transferred by wire communication through a network such as a LAN (Local Area Network) or the Internet to the computer. The computer thus can receive the program transferred in this manner by a communication section 108 and install the program into the hard disk 105 built therein.

The computer has a built-in CPU (Central Processing Unit) 102. An input/output interface 110 is connected to the CPU 102 through a bus 101. Consequently, if an instruction is inputted through the input/output interface 110 when an inputting section 107 formed from a keyboard, a mouse, a microphone and so forth is operated by the user or the like, then the CPU 102 loads a program stored in the ROM (Read Only Memory) 103 in accordance with the instruction. Or, the CPU 102 loads a program stored on the hard disk 105, a program transferred from a satellite or a network, received by the communication section 108 and installed in the hard disk 105, or a program read out from the removable recording medium 111 loaded in a drive 109 and installed in the hard disk 105, into a RAM (Random Access Memory) 104 and then executes the program. Consequently, the CPU 102 performs the process in accordance with the flow charts described hereinabove or performs processes which can be performed by the configuration described hereinabove with reference to the block diagrams. Then, as occasion demands, the CPU 102 causes, for example, an outputting section 106, which is formed from an LCD (Liquid Crystal Display) unit, a speaker and so forth, to output a result of the process through the input/output interface 110 or causes the communication section 108 to transmit or the hard disk 105 to record the result of the process.

It is to be noted that, in the present specification, the steps which describe the program for causing a computer to execute various processes may be but need not necessarily be processed in a time series in the order as described as the flow charts, and include processes which are executed in parallel or individually (for example, processes by parallel processing or by an object).

Further, the program may be processed by a single computer or may otherwise be processed in a distributed fashion by a plurality of computers. Further, the program may be transferred to and executed by a computer at a remote place.

The invention claimed is:

1. A signal processing apparatus for processing an audio signal, comprising:

a detection section configured to detect a first tempo from the audio signal;

a calculation section configured to calculate a speed feeling value which is a numerical value indicating whether said first tempo is fast or slow, the speed feeling value being calculated based on a relationship of a plurality of different frequency components to respective frequency levels corresponding to the different frequency components of the audio signal;

a determining section configured to determine a second tempo by determining a correction to be made to the first tempo based on the speed feeling value, wherein the speed feeling value is determined by a ratio of a summation of all the products of multiplying each frequency component by its corresponding frequency level to a summation of all the frequency components.

2. A signal processing apparatus according to claim 1, wherein the different frequency components are each an amplitude level of the audio signal at a respective frequency level.

3. A signal processing apparatus according to claim 1, wherein the determining section compares the first tempo to a first predetermined threshold value and compares the speed feeling value to a second predetermined threshold value to determine whether or not the correction made to the first tempo needs to be increased or decreased.

4. A signal processing method, implemented on a signal processing apparatus, for processing an audio signal, comprising:

detecting, at the signal processing apparatus, a first tempo from the audio signal;

calculating, at the signal processing apparatus, a speed feeling value which is a numerical value indicating whether said first tempo is fast or slow, the speed feeling value being calculated based on a relationship of a plurality of different frequency components to respective frequency levels corresponding to the different frequency components of the audio signal;

determining, at the signal processing apparatus, a second tempo by determining a correction to be made to the first tempo based on the speed feeling value, wherein the speed feeling value is determined by a ratio of a summation of all the products of multiplying each frequency component by its corresponding frequency level to a summation of all the frequency components.

* * * * *